(12) United States Patent  
Huang et al.

(10) Patent No.: US 11,170,034 B1  
(45) Date of Patent: Nov. 9, 2021

(54) SYSTEM AND METHOD FOR DETERMINING CREDIBILITY OF CONTENT IN A NUMBER OF DOCUMENTS

(71) Applicant: FOXIT SOFTWARE INC., Fremont, CA (US)

(72) Inventors: Ming-Jen Huang, Taichung (TW); Chun-Fang Huang, Taichung (TW); Chi-Ching Wei, Taichung (TW)

(73) Assignee: FOXIT SOFTWARE INC., Fremont, CA (US)

( * ) Notice: Subject to any disclaimer, the term of this patent is extended or adjusted under 35 U.S.C. 154(b) by 0 days.

(21) Appl. No.: 17/026,721

(22) Filed: Sep. 21, 2020

(51) Int. Cl.
| | |
|---|---|
| *G06F 17/00* | (2019.01) |
| *G06F 16/383* | (2019.01) |
| *G06K 9/00* | (2006.01) |
| *G06F 16/35* | (2019.01) |
| *G06F 16/34* | (2019.01) |

(52) U.S. Cl.  
CPC .......... *G06F 16/383* (2019.01); *G06F 16/345* (2019.01); *G06F 16/35* (2019.01); *G06K 9/00463* (2013.01)

(58) Field of Classification Search  
CPC ...... G06F 16/383; G06F 16/35; G06F 16/345; G06K 9/00463  
See application file for complete search history.

(56) References Cited

U.S. PATENT DOCUMENTS

| | | | | |
|---|---|---|---|---|
| 5,930,788 | A * | 7/1999 | Wical | G06F 16/353 |
| 9,715,495 | B1 * | 7/2017 | Tacchi | G06F 16/358 |
| 2002/0052730 | A1 * | 5/2002 | Nakao | G06F 40/258 |
| | | | | 704/10 |
| 2011/0047619 | A1 * | 2/2011 | King | G06F 21/6218 |
| | | | | 726/23 |
| 2011/0202484 | A1 * | 8/2011 | Anerousis | G06N 7/005 |
| | | | | 706/12 |
| 2012/0137367 | A1 * | 5/2012 | Dupont | G06F 21/00 |
| | | | | 726/25 |
| 2012/0209853 | A1 * | 8/2012 | Desai | G06F 16/93 |
| | | | | 707/741 |
| 2012/0278300 | A1 * | 11/2012 | Soubbotin | G06F 16/338 |
| | | | | 707/706 |

(Continued)

OTHER PUBLICATIONS

Niraula, Experiments with Semantic Similarity Measures based on LDA and LSA, U of Memphis, p. 188-199 (Year: 2013).*

(Continued)

*Primary Examiner* — Andrew T McIntosh  
(74) *Attorney, Agent, or Firm* — Womble Bond Dickinson (US) LLP (57) ABSTRACT

A method for determining credibility of content in a number of documents includes: obtaining topics from each document; for each document, generating topic combinations, each topic combination being a subset of the topics of the document; for each topic combination, obtaining a summary from the corresponding document; performing a semantic similarity test on each pair of two summaries that are respectively from two documents, so as to obtain a similarity percentage between the two summaries; for a group of the topic combinations that are identical combinations of topic (s), calculating a credibility score for the group based on the similarity percentage(s) calculated for the summaries that correspond to the topic combinations in the group.

25 Claims, 5 Drawing Sheets

(56) References Cited

U.S. PATENT DOCUMENTS

| | | | | |
|---|---|---|---|---|
| 2012/0330958 A1* | 12/2012 | Xu | ................. | G06F 17/16 |
| | | | | 707/738 |
| 2018/0150459 A1* | 5/2018 | Farid | ................. | G06F 16/24578 |
| 2018/0189307 A1* | 7/2018 | Yu | ................. | G06F 16/221 |

OTHER PUBLICATIONS

Nguyen, Organizing Web Documents into Thematic Subsets Using an Ontology, VLDB journal, p. 1-12 (Year: 2003).*
Lee, An Empirical Evaluation of Models of Text Document Similarity, eScholarship.org, p. 1254-1259 (Year: 2005).*

* cited by examiner

SYSTEM AND METHOD FOR DETERMINING CREDIBILITY OF CONTENT IN A NUMBER OF DOCUMENTS

FIELD

The disclosure relates to a system and a method for determining credibility of content in a number of documents stored in a database.

BACKGROUND

Conventionally, to train an artificial neural network, a large amount of data may be inputted to the artificial neural network as training material. That the data inputted is credible (i.e., the content of the data is true) is beneficial to ensuring that the artificial neural network is properly trained.

For a database storing a large number of documents (e.g., 1000 to 10000 documents), manually verifying accuracy of each of the documents may be time consuming. In the related field, techniques related to generating a summarization of a single document have been available.

SUMMARY

One object of the disclosure is to provide a method for determining credibility of content in a number of documents stored in a database.

According to the disclosure, the method is implemented using a processor of an electronic device accessing the database. The method includes steps of:
  a) obtaining, from each of the documents, a plurality of topics;
  b) for each of the documents, generating a set of topic combinations, each of the topic combinations being a subset of the plurality of topics of the document;
  c) for each of the topic combinations of each of the documents, obtaining a summary from the document that corresponds to the topic combination;
  d) performing a semantic similarity test on each pair of two summaries that are respectively from two of the documents, so as to obtain a similarity percentage between the two summaries;
  e) for a group of the topic combinations that are identical combinations of topic(s), calculating a credibility score for the group based on the similarity percentage(s) calculated in step d) for the summaries that correspond to the topic combinations in the group; and
  f) output the credibility scores calculated in step e).

Another object of the disclosure is to provide a system that is capable of implementing the above-mentioned method.

According to one embodiment of the disclosure, the system includes an electronic device that includes a database storing the documents therein and a processor that is connected to the database. The processor is programmed to:
  obtain, from each of the documents, a plurality of topics;
  for each of the documents, generate a set of topic combinations, each of the topic combinations being a subset of the plurality of topics of the document;
  for each of the topic combinations of each of the documents, obtain a summary from the document that corresponds to the topic combination;
  perform a semantic similarity test on each pair of two summaries that are respectively from two of the documents, so as to obtain a similarity percentage between the two summaries;
  for a group of the topic combinations that are identical combinations of topic(s), calculate a credibility score for the group based on the similarity percentage(s) thus calculated for the summaries that correspond to the topic combinations in the group; and
  output the credibility scores thus calculated.

Another object of the disclosure is to provide a non-transitory computer-readable storage medium storing instructions that, when executed by a processor of an electronic device, cause the processor to perform steps of the above-mentioned method.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Figure 1:
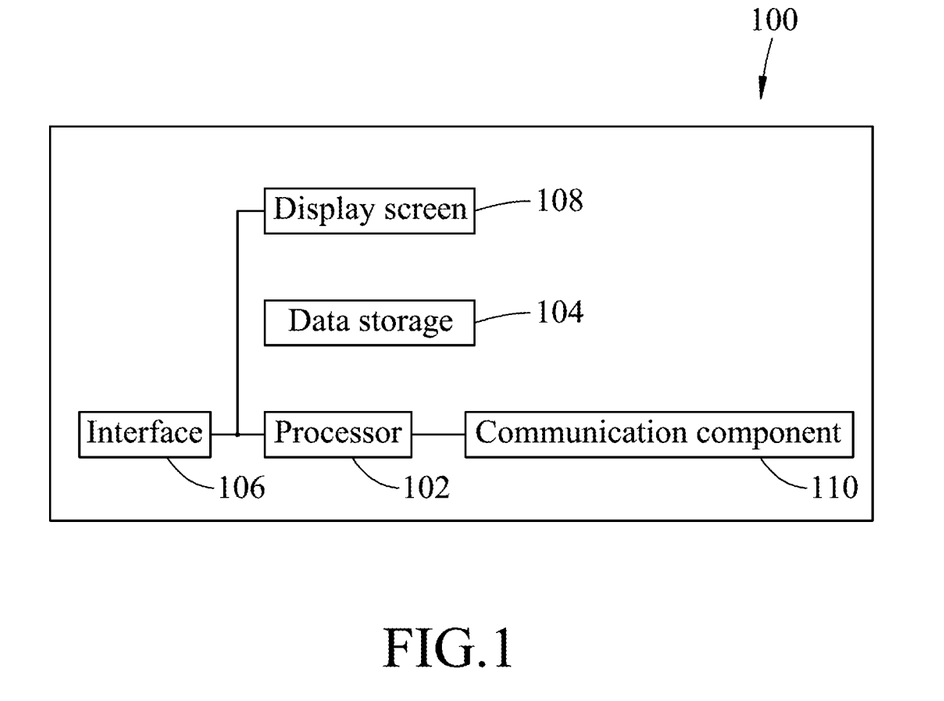
FIG. 1 is a block diagram of a system for determining credibility of content in a number of documents according to one embodiment of the disclosure.

FIG. 1 is a block diagram of a system 100 for determining credibility of content in a number of documents according to one embodiment of the disclosure. In this embodiment, the system 100 may be embodied using an electronic device such as a personal computer (PC), a laptop, a tablet, a smartphone, etc.

The system 100 includes a processor 102, a data storage 104, a user interface 106, a display screen 108 and a communication component 110.

The processor 102 may include, but not limited to, a single core processor, a multi-core processor, a dual-core mobile processor, a microprocessor, a microcontroller, a digital signal processor (DSP), a field-programmable gate array (FPGA), an application specific integrated circuit (ASIC), and/or a radio-frequency integrated circuit (RFIC), etc.

The data storage 104 may be embodied using one or more of a hard disk, a solid-state drive (SSD) and other non-transitory storage medium.

The user interface 106 may be embodied using a keyboard, a mouse, or other components that enable a user to operate so as to input a command for interacting with the system 100. In some embodiments, the user interface 106 may be integrated with the display screen 108 as a touchscreen.

The communicating component 110 may include a short-range wireless communicating module supporting a short-range wireless communication network using a wireless technology of Bluetooth® and/or Wi-Fi, etc., and a mobile communicating module supporting telecommunication using Long-Term Evolution (LTE), the third generation (3G) and/or fourth generation (4G) of wireless mobile telecommunications technology, and/or the like.

The system 100 may further include a connection port (e.g., a universal serial bus (USB) port) (not shown) for establishing a connection with an external device (e.g., a USB flash drive).

In this embodiment, the data storage 104 stores a software application that includes instructions that, when executed by the processor 102, cause the processor 102 to perform a number of operations as described below. Additionally, the data storage 104 may store a database therein. The database includes a number of documents (e.g., 1000 to 10000 documents). Each of the documents may contain texts, charts, images, or a combination thereof.

It is noted that in other embodiments, the database may be stored in a separate storage medium (e.g., the external device) externally connected to the system 100 via the connection port.

Figure 2:
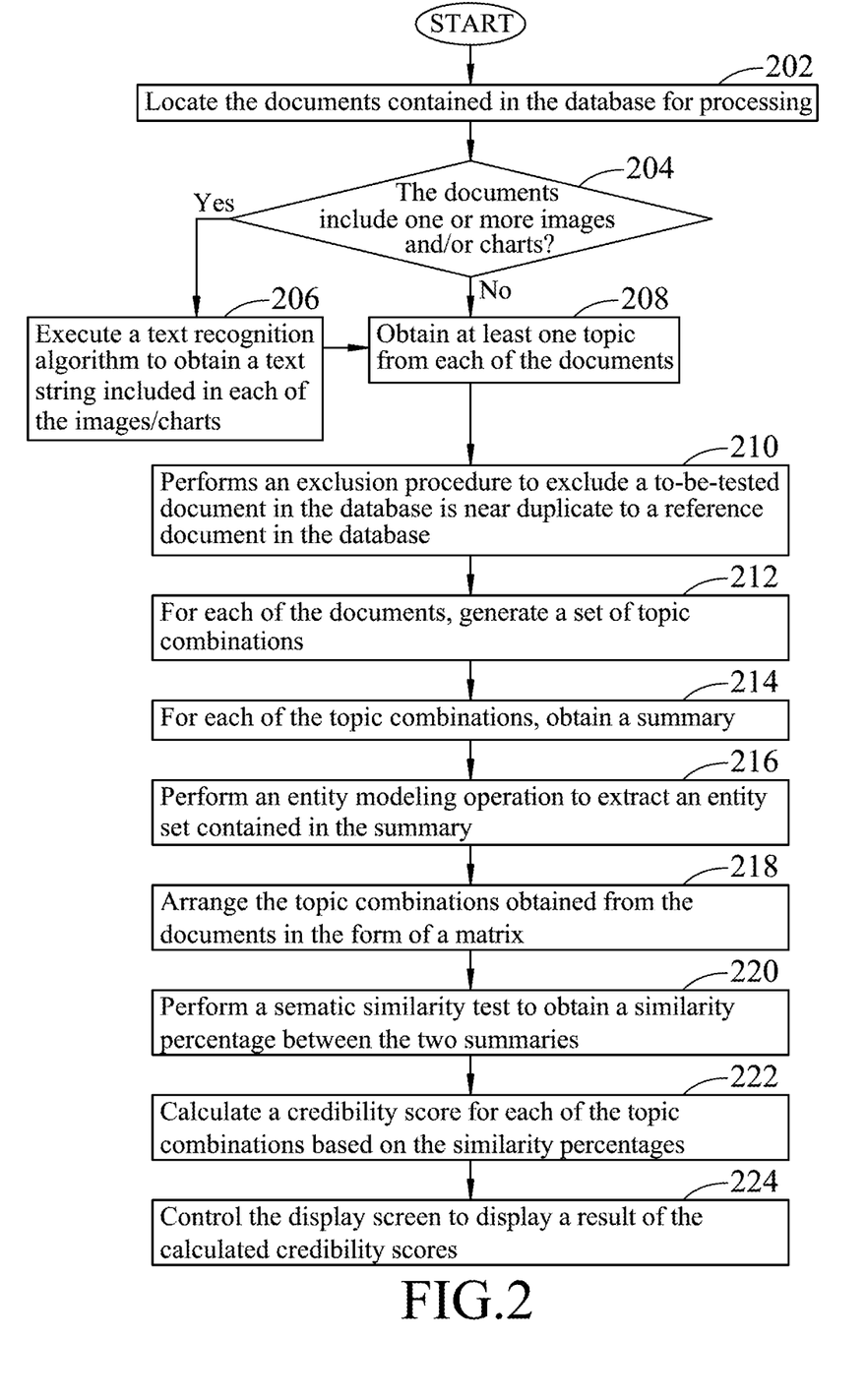
FIG. 2 is a flow chart illustrating steps of a method for determining credibility of content in a number of documents stored in a database according to one embodiment of the disclosure.

FIG. 2 is a flow chart illustrating steps of a method for determining credibility of content in a number of documents stored in a database according to one embodiment of the disclosure. In this embodiment, the method may be implemented using the system 100 as described with reference to FIG. 1.

In use, a user may operate the user interface 106 to execute the software application. In response, in step 202, the processor 102 may locate the documents stored in the database for processing.

In some embodiments, the processor 102 may process all documents stored in the data storage 104. In other embodiments, the documents may be located by the user specifying a specific folder of the data storage 104, and the processor 102 may implement the subsequent steps with respect to the documents included in the folder.

Then, the processor 102 obtains, from each of the documents, a plurality of topics. To obtain the topics from each of the documents, the processor 102 executes steps 204, 206 and 208.

Specifically, the processor 102 may first obtain, for each of the documents, a text file of the document. For a document that contains only texts, the text file of the document may be the document itself. For a document that contains one or more images and/or charts, additional procedures may be undertaken in order to obtain the text file of the document.

As such, for each of the documents, the processor 102 may be programmed to determine whether the document contains one or more images and/or charts in step 204. When the determination is affirmative, the flow proceeds to step 206, in which the processor 102 executes a text recognition algorithm to obtain a text string included in each image/chart. Otherwise, the flow proceeds to step 208.

Specifically, in step 206, for each image determined to be included in the document, the processor 102 may execute a computer vision (CV) algorithm and a natural language processing (NLP) algorithm to obtain a text string included in the image. The CV algorithm may be a convolutional neural network (CNN) and is for detecting objects in the image, and the NLP algorithm may be a long short-term memory (LSTM) network and is for generating description of the objects. Further in step 206, for each chart determined to be included in the document, the processor 102 obtains a text string included in the chart, and one exemplary way of obtaining a text string included in the chart is described in an article entitled "Data Extraction from Charts via Single Deep Neural Network" by Xiaoyi Liu, Diego Klabjan and Patrick NBless.

Afterward, the processor 102 adds an image label text to each text string extracted from an image, adds a chart label text to each text string extracted from a chart, and incorporates the text string(s) to the text file of the document. The image/chart label text is a text that serves the purpose of labeling the text string to which it is attached. In this manner, in addition to the texts of the document that are originally in text form, the text file of the document further includes the text strings extracted from the images and/or charts in the document, and each of the text strings includes a label (i.e., the image label text or the chart label text) indicating the origin of the text string (i.e., image or chart).

In step 208, the processor 102 executes an NLP model (such as latent semantic analysis (LSA), latent Dirichlet allocation (LDA), etc.) on the text file to obtain a plurality of topics from each of the documents.

In one example, when the document is an article regarding a person (e.g., President Roosevelt), the topic thus obtained from the document may include "Roosevelt", "President", "Place of birth", "Education", etc.

It is noted that the NLP model used in this embodiment is readily known in the related art, and details thereof are omitted herein for the sake of brevity.

In step 210, the processor 102 performs an exclusion procedure to determine whether one of the documents (hereinafter referred to as "to-be-tested document") in the database is near duplicate to another one of the documents (hereinafter referred to as "reference document") in the database, and exclude the to-be-tested document when it is determined that the to-be-tested document is near duplicate to the reference document.

It is noted that the exclusion procedure is executed to determine whether two documents that are substantially identical to each other are present in the database. In such a case, one of the two documents may be discarded for subsequent operations.

In use, the processor 102 may execute a word-embedding algorithm to obtain a document vector associated with each of the documents. The word-embedding algorithm may for example be Doc2Vec.

Afterward, the processor 102 calculates a cosine similarity between the document vector of one of the documents serving as the to-be-tested document and the document vector of another one of the documents serving as the reference document. The cosine similarity thus calculated may then be used to determine whether the to-be-tested document and the reference document are near duplicates.

Specifically, when the cosine similarity thus calculated is higher than a pre-determined threshold (e.g., 0.95), the processor 102 determines that the to-be-tested document is near duplicate to the reference document.

When it is determined that the to-be-tested document is near duplicate to the reference document, the processor 102 excludes the to-be-tested document from the operations thereafter. In this manner, an amount of computation for implementing the method may be reduced.

In step 212, for each of the (remaining) documents, the processor 102 generates a set of topic combinations. Each of the topic combinations is a subset of the plurality of topics of the document. For example, for one document with three topics (A, B, and C), possible topic combinations may include A only, B only, C only, A+B, A+C, B+C, and A+B+C.

In step 214, for each of the topic combinations, the processor 102 obtains a summary from the document that corresponds to the topic combination in the form of a text paragraph. In practice, the summary is obtained from the text file of the document. Step 214 will be repeated for each of the documents. One exemplary way of obtaining a summary is described in an article entitled "*Topic-aware Pointer-Generator Networks for Summarizing Spoken Conversations*" by Zhengyuan Liu, Angela Ng, Sheldon Lee, Ai Ti Aw, and Nancy F. Chen. In use, the processor 102 may use binary classification to determine whether a sentence contained in the corresponding document should be used to constitute the summary.

The following Tables 1 to 3 illustrate exemplary topic combinations and associated summaries from three documents, respectively. Note that certain topic combinations from different documents may be identical combinations of topics (e.g., Topic Combination ID 1-1 from Document 1 and Topic Combination ID 2-1 from Document 2 are identical combinations of the topics "Roosevelt" and "President").

TABLE 1

(Document 1)

| Topic Combination ID | Associated Topics | Summary |
|---|---|---|
| 1-1 | Roosevelt, President | Roosevelt served as the 32nd president of the United States from 1933 until his death in 1945. |
| 1-2 | Roosevelt, President, Place of Birth | Roosevelt served as the 32nd president of the United States from 1933 until his death in 1945. He was born in Hyde Park, New York. |
| 1-3 | Roosevelt, Education | Roosevelt graduated from Harvard College. |

TABLE 2

(Document 2)

| Topic Combination ID | Associated Topics | Summary |
|---|---|---|
| 2-1 | Roosevelt, President | Roosevelt served as the 42nd president of the United States from 1943 until his death in 1955. |
| 2-2 | Roosevelt, President, Place of Birth | Roosevelt served as the 42nd president of the United States from 1943 until his death in 1955. He was born in Manhattan, New York City. |
| 2-3 | Roosevelt, Education | Roosevelt graduated from Harvard College. |

TABLE 3

(Document 3)

| Topic Combination ID | Associated Topics | Summary |
|---|---|---|
| 3-1 | Roosevelt, Education | Roosevelt graduated from Harvard College. |

In step 216, the processor 102 performs an entity modeling operation to extract an entity set contained in the summary. The entity set includes at least one entity associated with the text of the summary.

Specifically, the entity modeling operation may be done using a named entity recognition (NER) algorithm to determine whether one or more words in the text of the summary can be classified into one of a plurality of pre-determined entity classes. The entity classes may include name, location, date, time, company, product, etc. In some examples, a conditional random fields (CRFs) method may be applied for also taking context of the words into account.

Using the above examples from Tables 1 to 3, the following Tables 4 to 6 illustrate the entities (underlined) that are obtained from the summaries.

TABLE 4

(Document 1)

| Topic Combination ID | Associated Topics | Summary |
|---|---|---|
| 1-1 | Roosevelt, President | <u>Roosevelt</u> served as the <u>32nd president</u> of the United States from <u>1933</u> until his death in <u>1945</u>. |
| 1-2 | Roosevelt, President, Place of Birth | <u>Roosevelt</u> served as the <u>32nd president</u> of the United States from <u>1933</u> until his death in <u>1945</u>. He was born in <u>Hyde Park, New York</u>. |
| 1-3 | Roosevelt, Education | Roosevelt graduated from <u>Harvard College</u>. |

TABLE 5

(Document 2)

| Topic Combination ID | Associated Topics | Summary |
|---|---|---|
| 2-1 | Roosevelt, President | <u>Roosevelt</u> served as the <u>42nd president</u> of the United States from <u>1943</u> until his death in <u>1955</u>. |
| 2-2 | Roosevelt, President, Place of Birth | <u>Roosevelt</u> served as the <u>42nd president</u> of the United States from <u>1943</u> until his death in <u>1955</u>. He was born in <u>Manhattan, New York City</u>. |
| 2-3 | Roosevelt, Education | Roosevelt graduated from <u>Harvard College</u>. |

TABLE 6

(Document 3)

| Topic Combination ID | Associated Topics | Summary |
|---|---|---|
| 3-1 | Roosevelt, Education | Roosevelt graduated from Harvard College. |

In step 218, the processor 102 arranges the topic combinations obtained from the documents in the form of a matrix.

Then, in step 220, the processor 102 performs a semantic similarity test on each pair of two summaries respectively from two of the documents so as to obtain a similarity percentage between the two summaries. In the manner as shown in the Table 7, each of the topic combinations of one document is paired with each of the topic combinations from another document, and their corresponding summaries form a pair of summaries. The following Table 7 illustrates the resulting matrix, with an "x" indicating a pair of summaries that originate from a same document, which may be disregarded.

TABLE 7

|     | 1-1 | 1-2 | 1-3 | 2-1 | 2-2 | 2-3 | 3-1 |
|-----|-----|-----|-----|-----|-----|-----|-----|
| 1-1 | x   | x   | x   |     |     |     |     |
| 1-2 | x   | x   | x   |     |     |     |     |
| 1-3 | x   | x   | x   |     |     |     |     |
| 2-1 |     |     |     | x   | x   | x   |     |
| 2-2 |     |     |     | x   | x   | x   |     |
| 2-3 |     |     |     | x   | x   | x   |     |
| 3-1 |     |     |     |     |     |     | x   |

Figure 3:
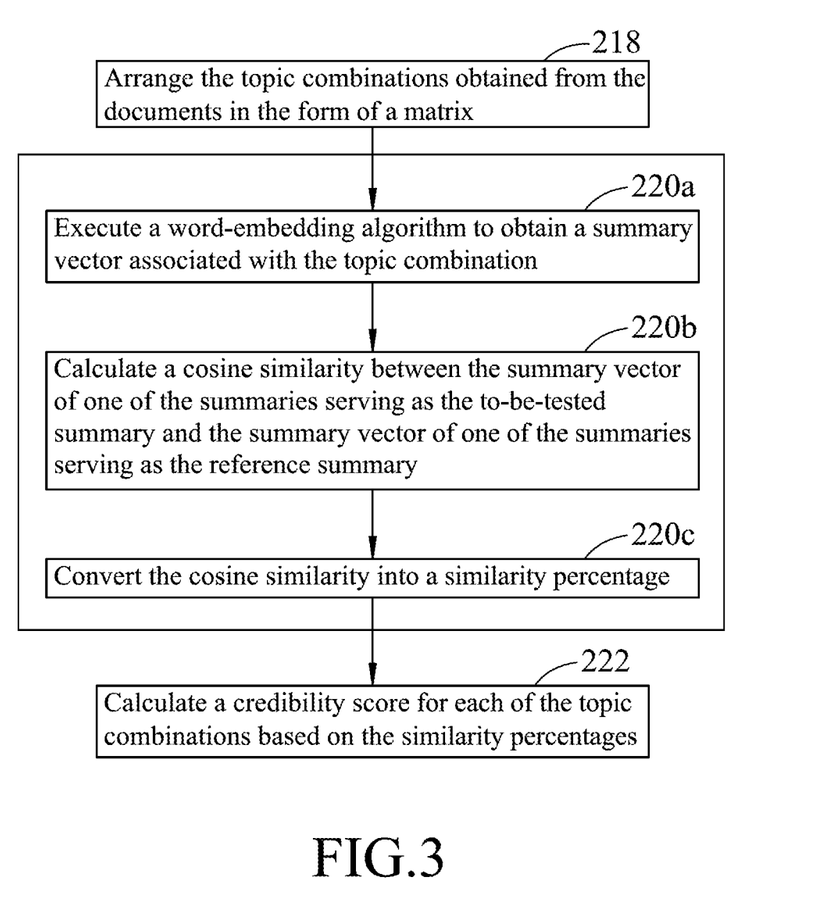
FIG. 3 is a flow chart illustrating sub-steps of performing a semantic similarity test on each pair of two summaries that are respectively from two of the documents.

In use, the operations of step 220 may be done by the processor 102 as illustrated in FIG. 3.

In sub-step 220a, for each of the summaries, the processor 102 executes a word-embedding algorithm to obtain a summary vector associated with the corresponding topic combination. The word-embedding algorithm may for example be Doc2Vec for mapping words or phrases of the summary to the summary vector.

In sub-step 220b, the processor 102 calculates a cosine similarity between the summary vector of one of the summaries (hereinafter referred to as "to-be-tested summary") and the summary vector of another one of the summaries (hereinafter referred to as "reference summary"). It is noted that in some embodiments, the processor 102 further compares the entity sets of the pair of summaries.

In sub-step 220c, the processor 102 converts the cosine similarity into a similarity percentage. In this embodiment, the processor 102 may directly use the cosine similarity as the similarity percentage.

In the embodiments where the entity sets of the pair of summaries are compared, the similarity percentage may be calculated in a weighted sum model (WSM). For example, the processor 102 may calculate the cosine similarity, compare the entity sets of the pair of summaries to obtain an entity similarity, and calculate the similarity percentage using the following formula:

Similarity Percentage=(cosine similarity×0.4)+(entity similarity×0.6).

The following Table 8 illustrates the similarity percentage calculated for each pair of summaries using the above example.

TABLE 8

|     | 1-1 | 1-2 | 1-3 | 2-1 | 2-2 | 2-3  | 3-1  |
|-----|-----|-----|-----|-----|-----|------|------|
| 1-1 | x   | x   | x   | 50% | 50% | 20%  | 20%  |
| 1-2 | x   | x   | x   | 50% | 50% | 20%  | 20%  |
| 1-3 | x   | x   | x   | 20% | 20% | 100% | 100% |
| 2-1 | —   | —   | —   | x   | x   | x    | 20%  |
| 2-2 | —   | —   | —   | x   | x   | x    | 10%  |
| 2-3 | —   | —   | —   | x   | x   | x    | 100% |
| 3-1 | —   | —   | —   | —   | —   | —    | x    |

In the case where images are present in at least one of the documents, the processor 102 may determine whether both summaries in the pair of summaries contain an image label text. When it is determined that both summaries in the pair of summaries contain an image label text, the processor 102 further performs the semantic similarity test on the text strings included in the pair of summaries. For documents including charts, the chart label text is also considered in a similar fashion.

Alternatively, the processor 102 may execute an image similarity algorithm to compare the images, so as to obtain an image similarity. In this embodiment, a deep ranking application may be applied to serve as the image similarity algorithm. It is noted that the image similarity algorithm is readily available in the related art, and details thereof are omitted herein for the sake of brevity. Afterward, the processor 102 may calculate the similarity percentage using the following formula:

Similarity Percentage=(cosine similarity×0.3)+(entity similarity×0.4+image similarity×0.3.

Afterward, in step 222, for a group of the topic combinations that are identical combinations of topic(s), the processor 102 calculates a credibility score for the group based on the similarity percentage(s) calculated in step 220 for the summaries that correspond to the topic combinations in the group. For example, Topic Combination ID 1-1 from Document 1 and Topic Combination ID 2-1 from Document 2 form a group because they are identical combinations of the topics of "Roosevelt" and "President".

Specifically, using the above example as shown in Tables 1 to 3, the topic combination IDs 1-1 and 2-1 are associated with the combination of the topics of "Roosevelt" and "President" and belong to a group. Looking up the similarity percentages in Table 8, the similarity percentage for the pair of summaries that correspond to the topic combination IDs 1-1 and 2-1 is 50%, and in turn, the processor 102 calculates a credibility score for the group related to the combination of the topics of "Roosevelt" and "President" to be 0.5.

The topic combination IDs 1-2 and 2-2 are associated with the combination of the topics of "Roosevelt", "President" and "Place of Birth" and belong to another group. Looking up the similarity percentages in Table 8, the similarity percentage for the pair of summaries that correspond to the topic combination IDs 1-2 and 2-2 is 20%, and in turn, the processor 102 calculates a credibility score for the group related to the combination of the topics of "Roosevelt", "President" and "Place of Birth" to be 0.2.

The topic combination IDs 1-3, 2-3 and 3-1 are associated with the combination of the topics of "Roosevelt" and "Education" and belong to yet another group. Looking up the similarity percentages in Table 8, the similarity percentage for the pair of summaries that correspond to the topic combination IDs 1-3 and 2-3 is 100%, the similarity percentage for the pair of summaries that correspond to the topic combination IDs 1-3 and 3-1 is 100%, and the similarity percentage for the pair of summaries that correspond to the topic combination IDs 2-3 and 3-1 is 100%. In turn, the processor 102 calculates a credibility score for the group related to the combination of the topics of "Roosevelt" and "Education" to be 1.

After the credibility scores are calculated, in step 224, the processor 102 controls the display screen 108 to display a result of the calculated credibility scores.

Figure 4:
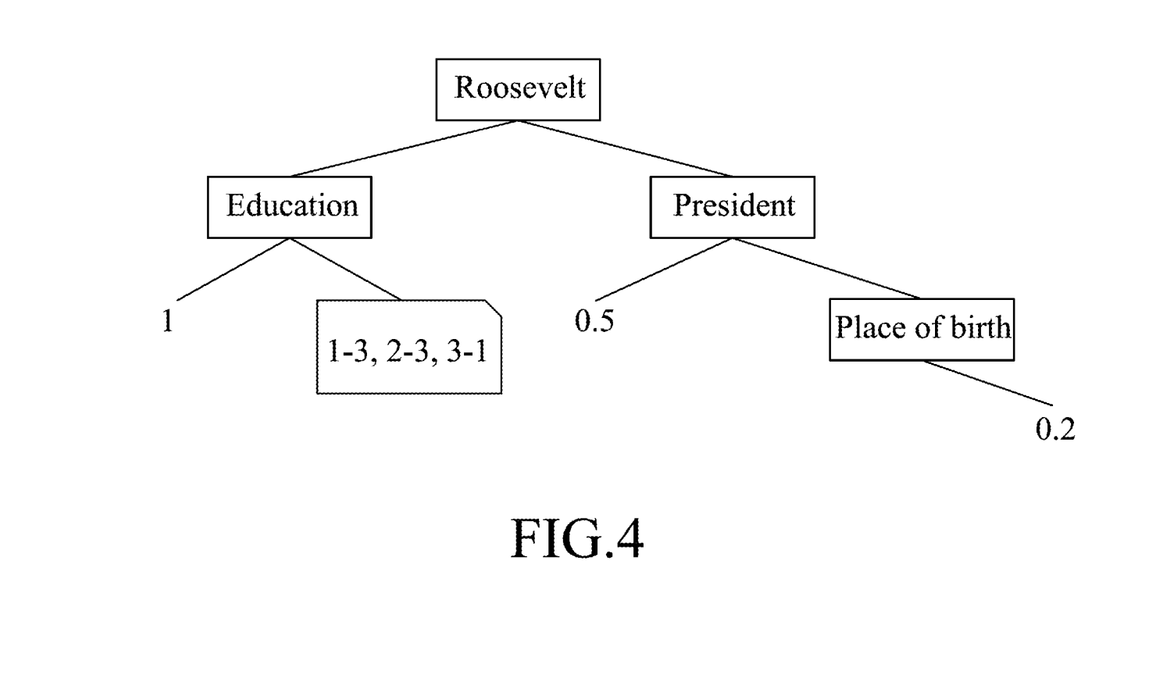
FIG. 4 is a schematic view of an exemplary undirected acyclic graph showing a number of combinations of topics and associated credibility scores, according to one example.

Specifically, in this embodiment, the processor 102 constructs an undirected acyclic graph based on the topics and the credibility scores. The combinations of topic(s) and the associated credibility scores are apparent from the undirected acyclic graph. Then, the processor 102 controls the display screen 108 to display the undirected acyclic graph. FIG. 4 illustrates an exemplary undirected acyclic graph using the above example.

In this embodiment, the processor 102 may be programmed to, for any group with a credibility score higher than a pre-determined threshold (e.g., 0.5), label the content of the summaries that correspond to the topic combinations belonging to the group as reliable, and, for any group with a credibility score lower than the pre-determined threshold, label the content of the summaries that correspond to the topic combinations belonging to the group as unreliable. Any combination of topics that corresponds to summaries labeled as unreliable may be displayed in a specific color (e.g., red) to provide a notification to the user.

In response to the notification, one or more ways may be employed to rectify the issue of a low credibility score. In some embodiments, the user may operate the user interface 106 to import additional document(s) into the database (via, for example, the Internet) and control the processor 102 to implement the above method again. In this manner, the credibility scores for each of the combinations of topic(s) may be updated accordingly.

Alternatively, in some embodiments, the user may manually operate the user interface 106 to verify content corresponding to the combination(s) of topic(s) with a low credibility score. For example, the user may review the content of a selected one of the summaries, and manually input a user-input command to indicate that content of the selected one of the summaries is accurate. In this manner, the selected one of the summaries is labeled as ground truth.

Using the example as shown in FIG. 4, the user may operate the user interface 106 to input a user-input command to indicate that the summary of the topic combination ID 1-2, which says "Roosevelt served as the 32nd president of the United States from 1933 until his death in 1945. He was born in Hyde Park, New York", is ground truth.

In response to receipt of the user-input command, the processor 102 may adjust the credibility score of any one of the groups of topic combinations that is related to the selected one of the summaries. One exemplary relation is that the to-be-adjusted group is one of the groups to which the topic combination that corresponds to the selected one of the summaries belongs. Another exemplary relation is that the to-be-adjusted group and one of the groups to which the topic combination that corresponds to the selected one of the summaries belongs share at least one common topic. Another exemplary relation is that the to-be-adjusted group is one of the groups that has a topic combination which originates from a same document as the selected one of the summaries.

Figure 5:
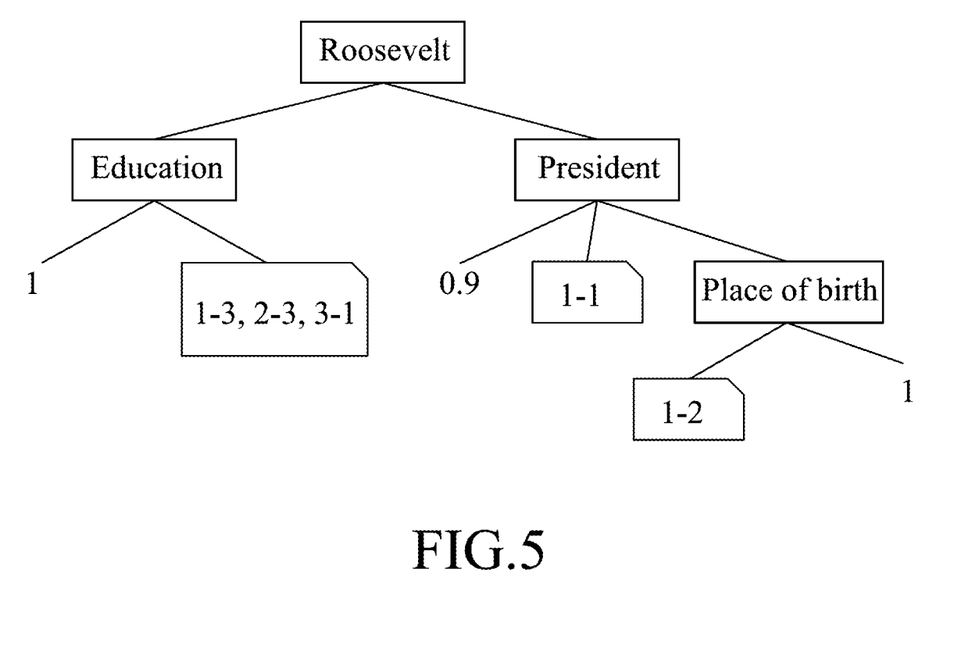
FIG. 5 is a schematic view of an exemplary undirected acyclic graph showing a number of combinations of topics and associated credibility scores after receipt of a user-input command designating a selected summary as ground truth, according to one example.

In the case shown in FIG. 5, the credibility score of the group of topic combinations ("Roosevelt", "President", and "Place of Birth") that is related to the selected one of the summaries (which corresponds to the topic combination ID 1-2) is adjusted to 1 (since user verification is received). As such, since the content of the summary that corresponds to the topic combination ID 1-2 is now regarded as ground truth, the content of the summary that corresponds to the topic combination ID 2-2, which belongs to the same group as the topic combination ID 1-2, may be disregarded.

Since the topics of the topic combination ID 1-1 is related to those of the topic combination ID 1-2, the credibility score of the group to which the topic combination ID 1-1 belongs may also be adjusted. This may be done by adjusting the credibility score of the topic combination ID 1-1 to a similarity percentage between the two summaries that respectively correspond to the topic combination ID 1-1 and the topic combination ID 1-2, wherein such similarity percentage may be obtained by performing a semantic similarity test similar to that depicted in step 220 on the topic combination ID 1-1 and the topic combination ID 1-2. The credibility score for the group to which the topic combination ID 1-1 belongs (namely, the combination of the topics of "Roosevelt" and "President") may be 0.9 after the adjustment in this example shown in FIG. 5.

After the adjustment, the content of the summaries that correspond to the groups to which the topic combination IDs 1-1 and 1-2 respectively belong may also be labeled as reliable. FIG. 5 illustrates a resulting exemplary undirected acyclic graph of the topics.

According to one embodiment, when it is determined that a contradiction between two summaries associated with a same combination of topic(s) or similar combinations of topic(s) is detected in the operations of step 220, the processor 102 may generate an alert in step 224 and control the display screen 108 to display the alert with respect to the combination (s) of topic (s) to request user assistance. For example, the topic combination IDs 1-2 and 2-2 both include the time of service of Franklin D. Roosevelt as the President, but the corresponding summaries contradict each other in terms of the order of presidency (32/42) and the specific years (1933 to 1945/1943 to 1955) of the presidency. In this case, the processor 102 may not be able to determine which one is correct, and may display the alert to notify the user to perform the verification.

To sum up, the embodiments of the disclosure provide a method and a system for determining credibility of content in a number of documents stored in a database by obtaining topics from each of the documents, generating topic combinations, obtaining summaries for the topic combinations, and comparing the summaries so as to calculate a credibility score for each group of the topic combinations that are identical combinations of topic(s). In this manner, the system 100 is capable of automatically determining the credibility of content related to each of the topics mentioned in the documents that are contained in the database, and to alert the user to verify content related to any topic combination that is labeled as unreliable.

Additionally, in response to newly received information (such as newly imported documents, or user-input command designating a selected one of the summaries as ground truth), the system 100 is capable of automatically implementing the method to update the credibility scores.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A method for determining credibility of content in a number of documents stored in a database, the method being implemented using a processor of an electronic device accessing the database, the method comprising steps of:
   a) obtaining, from each of the documents, a plurality of topics;
   b) for each of the documents, generating a set of topic combinations, each of the topic combinations being a subset of the plurality of topics of the document;
   c) for each of the topic combinations of each of the documents, obtaining a summary from the document that corresponds to the topic combination;
   d) performing a semantic similarity test on each pair of two summaries that are respectively from two of the documents, so as to obtain a similarity percentage between the two summaries;
   e) for a group of the topic combinations that are identical combinations of topic(s), calculating a credibility score for the group based on the similarity percentage(s) calculated in step d) for the summaries that correspond to the topic combinations in the group; and
   f) outputting the credibility scores calculated in step e).

2. The method of claim 1, further comprising, between steps a) and b), the steps of:
   performing an exclusion procedure to determine whether a to-be-tested document in the database is near duplicate to a reference document in the database; and
   when it is determined that the to-be-tested document is near duplicate to the reference document, excluding the to-be-tested document from the operations of step b).

3. The method of claim 2, wherein the exclusion procedure includes:
   for each of the documents, executing a word-embedding algorithm to obtain a document vector associated with the document;
   calculating a cosine similarity between the document vector of one of the documents that serves as the to-be-tested document and the document vector of another one of the documents that serves as the reference document;
   when the cosine similarity thus calculated is higher than a pre-determined threshold, determining that the to-be-tested document is near duplicate to the reference document.

4. The method of claim 1, wherein step d) includes:
   for each of the summaries, executing a word-embedding algorithm to obtain a summary vector associated with the topic combination;
   calculating a cosine similarity between the summary vector of one of the summaries serving as a to-be-tested summary and the summary vector of another one of the summaries serving as a reference summary; and
   converting the cosine similarity into the similarity percentage.

5. The method of claim 1, further comprising, after step c):
   for each of the summaries, performing an entity modeling operation to extract an entity set contained in the summary, the entity set including at least one entity associated with text of the summary;
   wherein step d) includes, with respect to each pair of the summaries, comparing the entity sets of the pair of summaries.

6. The method of claim 1, further comprising, prior to step a), the step of obtaining, for each of the documents, a text file of the document;
   wherein step a) is implemented by obtaining the topics from the text file of each of the documents.

7. The method of claim 6, wherein the obtaining of the text file of the document includes:
   for each of the documents, determining whether an image is included in the document; and
   when it is determined that an image is included in the document,
      executing a computer vision (CV) algorithm and a natural language processing (NLP) algorithm to obtain a text string included in the image,
      adding an image label text to the text string, and
      incorporating the text string to the text file of the document.

8. The method of claim 7, wherein step d) includes;
   determining whether both summaries of the pair of summaries contain an image label text;
   when it is determined that both summaries of the pair of summaries contain an image label text, further performing the semantic similarity test on the text strings in the pair of summaries.

9. The method of claim 1, wherein step f) includes, for any group with a credibility score higher than a pre-determined threshold, labeling content of the summaries that correspond to the topic combinations belonging to the group as reliable, and, for any group with a credibility score lower than the pre-determined threshold, labeling the content of the summaries that correspond to the topic combinations belonging to the group as unreliable.

10. The method of claim 9, wherein the combinations of topic(s) and the associated credibility scores are displayed in an undirected acyclic graph.

11. The method of claim 9, wherein:
    when in step d), a contradiction between two summaries associated with a same combination of topic (s) or similar combinations of topic(s) is detected, step f) further includes generating an alert with respect to the combination(s) of topic(s) to request user assistance.

12. The method of claim 9, further comprising, after step f):
    in receipt of a user-input command designating a selected one of the summaries as ground truth, adjusting, by the processor, the credibility score for any one of the groups of topic combinations that is related to the selected one of the summaries.

13. A system for determining credibility of content in a number of documents, comprising an electronic device that includes a database storing the documents therein and a processor that is connected to the database, wherein said processor is programmed to:

obtain, from each of the documents, a plurality of topics;

for each of the documents, generate a set of topic combinations, each of the topic combinations being a subset of the plurality of topics of the document;

for each of the topic combinations of each of the documents, obtain a summary from the document that corresponds to the topic combination;

perform a semantic similarity test on each pair of two summaries that are respectively from two of the documents, so as to obtain a similarity percentage between the two summaries;

for a group of the topic combinations that are identical combinations of topic(s), calculate a credibility score for the group based on the similarity percentage(s) thus calculated for the summaries that correspond to the topic combinations in the group; and output the credibility scores thus calculated.

14. The system of claim 13, wherein said processor is further programmed to, after obtaining the plurality of topics:

perform an exclusion procedure to determine whether a to-be-tested document in the database is near duplicate to a reference document in the database; and when it is determined that the to-be-tested document is near duplicate to the reference document, exclude the to-be-tested document from the operations of generating the sets of topic combinations.

15. The system of claim 13, wherein the exclusion procedure performed by said processor includes:

for each of the documents, executing a word-embedding algorithm to obtain a document vector associated with the document;

calculating a cosine similarity between the document vector of one of the documents that serves as the to-be-tested document and the document vector of another one of the documents that serves as the reference document;

when the cosine similarity thus calculated is higher than a pre-determined threshold, determining that the to-be-tested document is near duplicate to the reference document.

16. The system of claim 13, wherein said processor performs the semantic similarity test by:

for each of the summaries, executing a word-embedding algorithm to obtain a summary vector associated with the topic combination;

calculating a cosine similarity between the summary vector of one of the summaries serving as a to-be-tested summary and the summary vector of another one of the summaries serving as a reference summary; and converting the cosine similarity into the similarity percentage.

17. The system of claim 13, wherein said processor is further programmed to, after obtaining the summary:

for each of the summaries, perform an entity modeling operation to extract an entity set contained in the summary, the entity set including at least one entity associated with text of the summary;

wherein the semantic similarity test performed by said processor includes, with respect to each pair of the summaries, comparing the entity sets of the pair of summaries.

18. The system of claim 13, wherein said processor is further programmed to, prior to obtaining the plurality of topics, obtaining, for each of the documents, a text file of the document;

wherein said processor obtains the topics from the text file of each of the documents.

19. The system of claim 18, wherein said processor obtains the text file of the document by:

for each of the documents, determining whether an image is included in the document; and when it is determined that an image is included in the document, executing a computer vision (CV) algorithm and a natural language processing (NLP) algorithm to obtain a text string included in the image, adding an image label text to the text string, and incorporating the text string to the text file of the document.

20. The system of claim 19, wherein said processor performs the semantic similarity test by:

determining whether both summaries of the pair of summaries contain an image label text;

when it is determined that both summaries of the pair of summaries contain an image label text, further performing the semantic similarity test on the text strings in the pair of summaries.

21. The system of claim 13, wherein said processor outputs the credibility scores by:

for any group with a credibility score higher than a pre-determined threshold, labeling content of the summaries that correspond to the topic combinations belonging to the group as reliable; and for any group with a credibility score lower than the pre-determined threshold, labeling the content of the summaries that correspond to the topic combinations belonging to the group as unreliable.

22. The system of claim 21, further comprising a display screen, wherein said processor is further programmed to control said display screen to display the topic combinations of topic(s) and the associated credibility scores in an undirected acyclic graph.

23. The system of claim 21, wherein:

when a contradiction between two summaries associated with a same combination of topic(s) or similar combinations of topic(s) is detected when performing the semantic similarity test, said processor is further programmed to generate and output an alert with respect to the combination (s) of topic (s) to request user assistance.

24. The system of claim 21, wherein said processor is further programmed to, after outputting the credibility scores:

in receipt of a user-input command designating a selected one of the summaries as ground truth, adjust the credibility score for any one of the groups of topic combinations that is related to the selected one of the summaries.

25. A non-transitory computer-readable storage medium storing instructions that, when executed by a processor of an electronic device, cause the processor to perform steps of the method of claim 1.

* * * * *